(12) United States Patent
Queveau et al.

(10) Patent No.: US 7,204,542 B2
(45) Date of Patent: Apr. 17, 2007

(54) REAR DECK HOOD WITH CONSTANT BEARING FORCE LOCKING AND VEHICLE EQUIPPED THEREWITH

(75) Inventors: Gérard Queveau, Le Pin (FR); Paul Queveau, Montravers (FR); Jean-Marc Guillez, Cirieres (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 16 days.

(21) Appl. No.: 10/521,677

(22) PCT Filed: Jun. 30, 2004

(86) PCT No.: PCT/FR2004/001688

§ 371 (c)(1),
(2), (4) Date: Jul. 25, 2005

(87) PCT Pub. No.: WO2005/012019

PCT Pub. Date: Feb. 10, 2005

(65) Prior Publication Data
US 2006/0043757 A1 Mar. 2, 2006

(30) Foreign Application Priority Data
Jul. 2, 2003 (FR) .................................. 03 08049

(51) Int. Cl.
*B60J 7/20* (2006.01)
*B62D 25/10* (2006.01)
(52) U.S. Cl. ............... 296/107.08; 296/76; 296/136.06
(58) Field of Classification Search .......... 296/107.08, 296/76, 136.03, 136.05, 136.06, 136.09
See application file for complete search history.

(56) References Cited

U.S. PATENT DOCUMENTS

| 6,164,713 | A * | 12/2000 | Graf et al. ............. 296/107.08 |
| 6,464,282 | B2 * | 10/2002 | Ellermann et al. ............ 296/70 |
| 6,604,775 | B2 * | 8/2003 | Obendiek .................... 296/108 |
| 6,811,206 | B2 * | 11/2004 | Wagner .................. 296/136.05 |
| 6,824,194 | B2 * | 11/2004 | Weissmueller et al. . 296/136.05 |
| 6,866,327 | B2 * | 3/2005 | Willard .................. 296/136.06 |
| 6,948,762 | B2 * | 9/2005 | Antreich ................. 296/136.06 |
| 7,004,529 | B2 * | 2/2006 | Guillez et al. ................. 296/76 |
| 7,032,947 | B2 * | 4/2006 | Queveau et al. ......... 296/24.44 |
| 7,032,952 | B2 * | 4/2006 | Dilluvio ................. 296/107.08 |
| 7,093,885 | B2 * | 8/2006 | Guillez et al. ......... 296/107.08 |
| 2006/0131920 | A1 * | 6/2006 | Queveau et al. ....... 296/107.08 |

\* cited by examiner

*Primary Examiner*—Dennis H. Pedder
*Assistant Examiner*—Greg Blankenship
(74) *Attorney, Agent, or Firm*—Daphne L. Burton

(57) ABSTRACT

A rear boot (3) hood (4), for a convertible vehicle (1) swivels in relation to the bodyshell, via a first assembly element (13) capable of engaging in a detachable manner into a second assembly element (14) linked to the bodyshell. First and second runner surfaces (13a, 14a, 16c and 17a) work together at the end of the swivel movement of the hood. Means for locking/unlocking comprising first and second means for engaging (16 and 17) lock the hood in relation to the bodyshell. According to the invention, the first and second means for engaging (16 and 17) respectively have between them first and second contact surfaces with co-operative shapes, so that for at least the main part of its stroke, said first means for engaging (16) applies a substantially constant pressure on the corresponding second means for engaging (17).

16 Claims, 5 Drawing Sheets

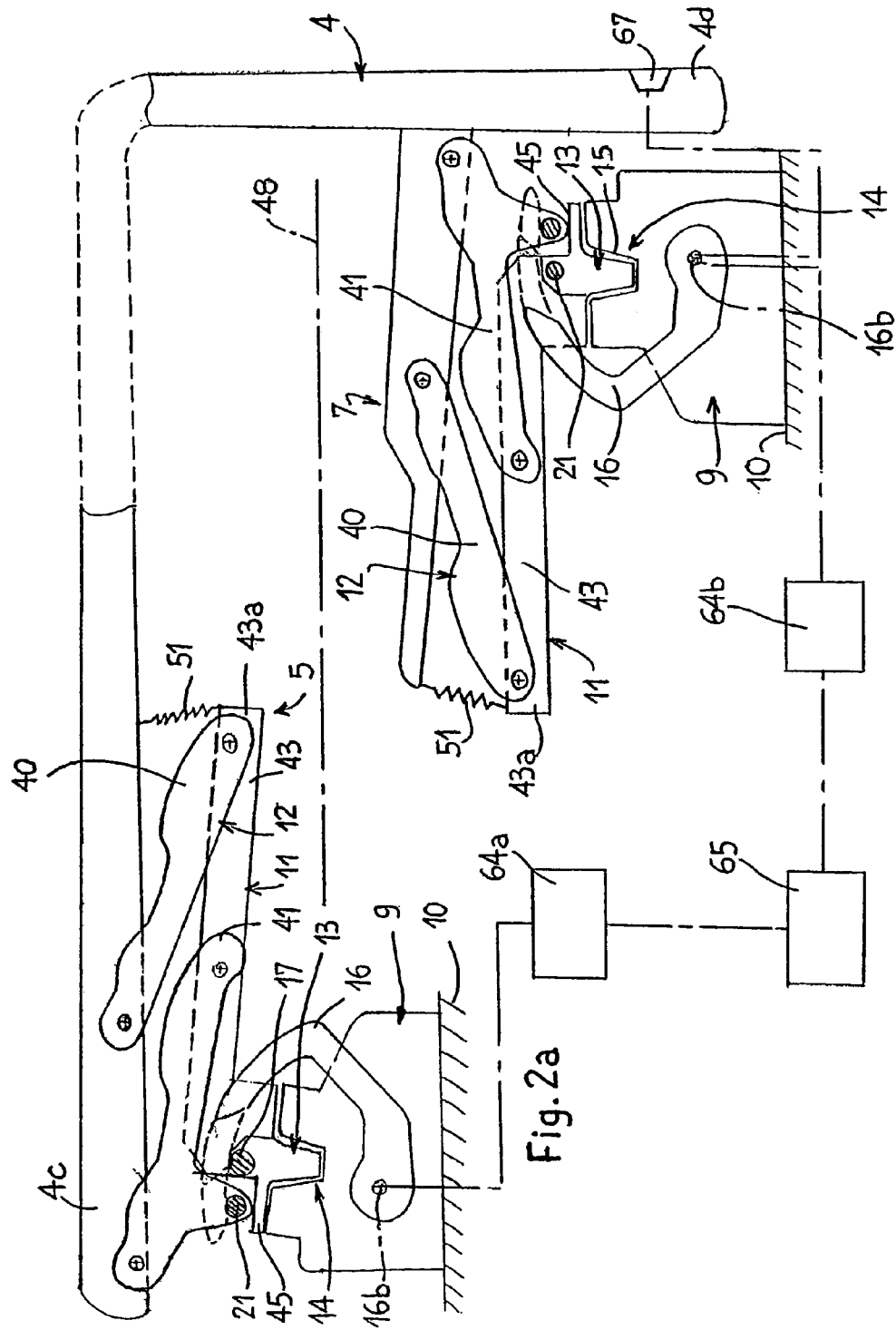

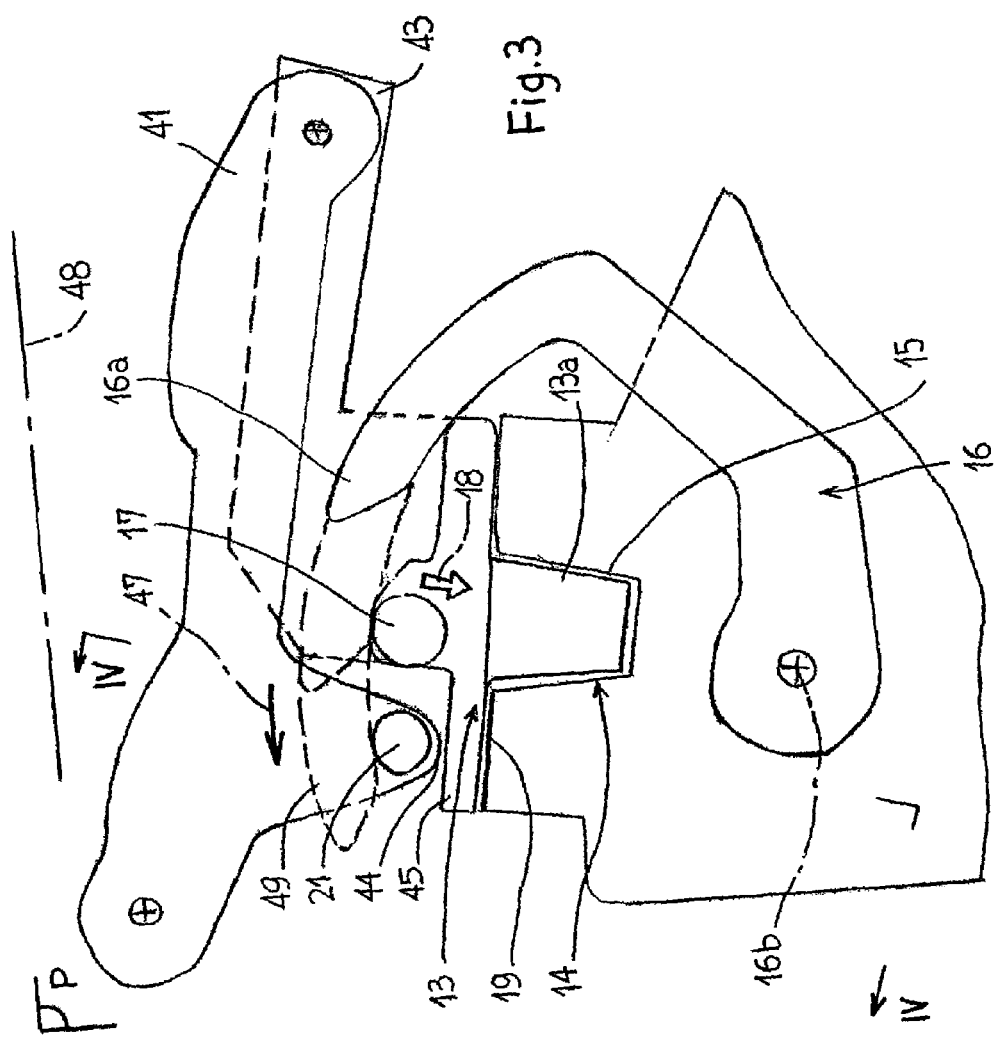

REAR DECK HOOD WITH CONSTANT BEARING FORCE LOCKING AND VEHICLE EQUIPPED THEREWITH

CROSS-REFERENCE TO RELATED APPLICATIONS

This application claims priority to French patent application No. 0308049 filed on or about Jul. 2, 2003. A related application was also filed under the Patent Cooperation Treaty on or about Jun. 30, 2004, as PCT/FR04/01688. The PCT application claims priority to the French patent application.

BACKGROUND OF THE INVENTION

1. Field of the Invention

The invention relates to the articulation and the locking of a boot hood on a car, in principle a convertible with a fold away roof inside the boot. Advantageously, sets of pivots to make the hood swivel from the rear to the front and from the front to the rear are fitted.

The invention relates to a device defined on the corresponding vehicle for this purpose.

2. Description of the Related Art

In FR-B-2 777 271 each set of pivots is a lock whose function is either to lock or articulate the hood so that it can either open from the front to the rear or from the rear to the front.

Each group of pivots here comprises a base firmly linked to the bodyshell of the vehicle, a part linked to the hood via a piece creating a hinge and which comprises a first assembly element capable of engaging in a detachable manner into a second assembly element linked to the corresponding base, by means of first and second runner surface(s) respectively fitted to the first assembly element, on one hand, and to the second assembly element and/or to a movable part of means for locking/unlocking; on the other hand, these first and second runner surface(s) only work together at the end of the swivel movement of the hood compared to the bodyshell, to then guide the hood to its locked position, the means for locking/unlocking comprising a first means for engaging linked to the base in a movable manner according to a locking/unlocking direction and capable of engaging in a free manner a second complementary means for engaging linked to the first assembly element so as to, in a locked position, lock the bodyshell in relation to said base, means for controlling being moreover fitted so as to induce the second means for engaging onto the displacement track of the first means for engaging, and according to an engagement direction transversal to said locking/unlocking direction.

Advantageously, each first means for engaging comprises a hook locking onto a backup support of the shell of the hood, such as a stub.

Irrespective of how effective it is, this solution can be improved so as to be able to swivel the hood with greater precision.

The solution in EP-A-1 157 871, where the locking of the assembly element linked to the hood facing the other assembly element linked to the structure of the vehicle which can only be operated once the orifices, respectively wedge-shaped co-operating with these two assembly elements, are accurately aligned, considering the shape and the diameter of the locking bar designed to engage into these orifices, can also be improved.

However, it risks creating wear and tear on the first and second means co-operating with the locking device, after repeated contact between them, this problem being all the more troublesome when the means for locking are associated with complex mechanisms, as in this case, in which any precision error in the position of the parts risks jamming the entire mechanism.

In FR-A-2 835 477 locking via a powered hook can typically be made by linking a sensor commanding the shutting down of the drive motor of the hook, when the system is locked. The response time between the coming into contact with the sensor and the stopping of the motor can be enough for the hook to continue its course slightly, thus lowering the part to be locked linked to the hood and thereby generating, via repetitive movement, wear and tear either of the surface to be locked or of the hook head, which could result in substantially reducing the accuracy of the locking and/or articulating of the hood.

SUMMARY OF THE INVENTION

The purpose of the invention is to provide a solution that avoids these problems of wear and tear and that ensures an accurate positioning of the articulation zones (and preferably the locking zones too), of the hood, in relation to the structure of the vehicle, thus allowing to improve the operational safety and lasting reliability as much for the present powered locking/unlocking systems as for the means for positioning and articulating the hood, especially when the articulation and/or locking mechanisms are complex, implying the presence of many moving parts and moreover having to take into account some compensation for play, in connection with the seals.

In these conditions, the invention proposes that the aforementioned first and second means for engaging respectively have between them first and second contact surfaces with co-operative shapes linked to the movement of the first concerned means for engaging on its displacement track, said first means for engaging applies a substantially constant pressure on the corresponding second means for engaging.

Thus, the locking operation will not imply an inappropriate movement of the part to be locked despite the response time of the limit chain of the lock at the end of the locking stage, the given solution further offering the advantage of end guiding of the part to be locked, thus ensuring accurate locking and favourable hood articulation conditions.

To ensure this end guiding at the end of the swivelling of the hood bringing it into its locked position, an additional feature of the invention advises that said first and/or second contact surfaces have an initial pressure zone where, during locking, the contact is initiated between these surfaces, this initial contact zone being tilted in relation to the displacement direction of the first means for engaging and interposed across the track of this first means for engaging, so that the latter displaces the corresponding second means for engaging according to said locking direction, by applying a pressure that increases as the contact continues, before said pressure becomes and remains substantially constant, whereas the second means for engaging practically stops moving according to the locking direction.

If, in particular in FR-A-2 835 477, the benefit is perceived in using a swivel hook to ensure the locking, the constant pressure favoured by the solution of the invention can favourably be obtained by envisaging that the first means for engaging, swivel mounted, has an engaging surface extending according to a circle whose centre is located on the swivel axis of this first means for engaging.

We note that this solution can apply in the case of the slug moving in circles in FIG. 5 below.

Using as first swivelling means for engaging, a means with a hook whose contact surface is rounded, just as that of the second means for engaging, is an advantage in that the end of swivelling of the hood can thus be accompanied down to its locked position, the latter over a distance that can be greater than when a hood locking bolt is used being displaced in a straight line, the hook having the further advantage of cheaper manufacturing than for example the solution in FIG. 5.

To accompany the movement of the hood in order to place it as best as possible for locking, we suggest that the runner surfaces which, at this moment, co-operate between themselves are constituted both between the first and second assembly element(s) respectively linked to the hood and to the base and between the movable part of the lock and the second assembly element linked to the base.

For the first set of surfaces, we suggest using, in particular, a substantially wedge-shaped male element projecting over the first assembly element linked to the hood, this male element engaging into a female element, also wedge-shaped, capable of receiving it and belonging to the second assembly element.

Other than the above solutions, and possibly independent of them, the invention also has the purpose of obtaining a more efficient articulation mechanism than the current systems and a possibility of compensation for play between the concerned body and base, thus further favouring an accurate swivelling of the hood.

For this reason, it is proposed that the first assembly element of each set of pivots comprises a third complementary engaging element linked to the second assembly element and capable of being engaged in a free manner with the first means for engaging, which is designed so as to be able to have several positions of which one authorised rotation position of the hood in which, at the place of one among the front and rear sets of pivots, this first means for engaging maintains the second complementary engaging element engaged with it whilst releasing the third complementary engaging element from its engagement, thus ensuring the hinge effect during the swivel opening of the hood, whereas at the other place among said front and rear sets of pivots, the first engaging element releases both the second and third complementary engaging elements from being engaged with it, so that the hood can then be distanced at this place from the bodyshell by swivelling around said created hinge.

A selective double locking is thus obtained.

Such a structure is well adapted to take into account all the fits and clearances as much due to the mounting requirements of the hood as to the distortions of the latter during its different swivel movements, whilst ensuring its positive guiding into its locked position, with a double locking, which is an efficiency guarantee.

BRIEF DESCRIPTION OF THE DRAWINGS

Other features and advantages of the invention will come out from the detailed description below.

Of the appended drawings, given by way of non-restrictive examples:

FIGS. 2a and 2b are expanded views with detailed sections A and B from FIG. 1, respectively representing a unit of the front set of pivots and a unit of the rear set of pivots of a rear boot hood according to an embodiment of the invention, said hood being in its closed position;

FIG. 3 is an expanded view of an essential part of the unit of the front set of pivots in FIG. 2;

DETAILED DESCRIPTION OF THE INVENTION

Figure 1:
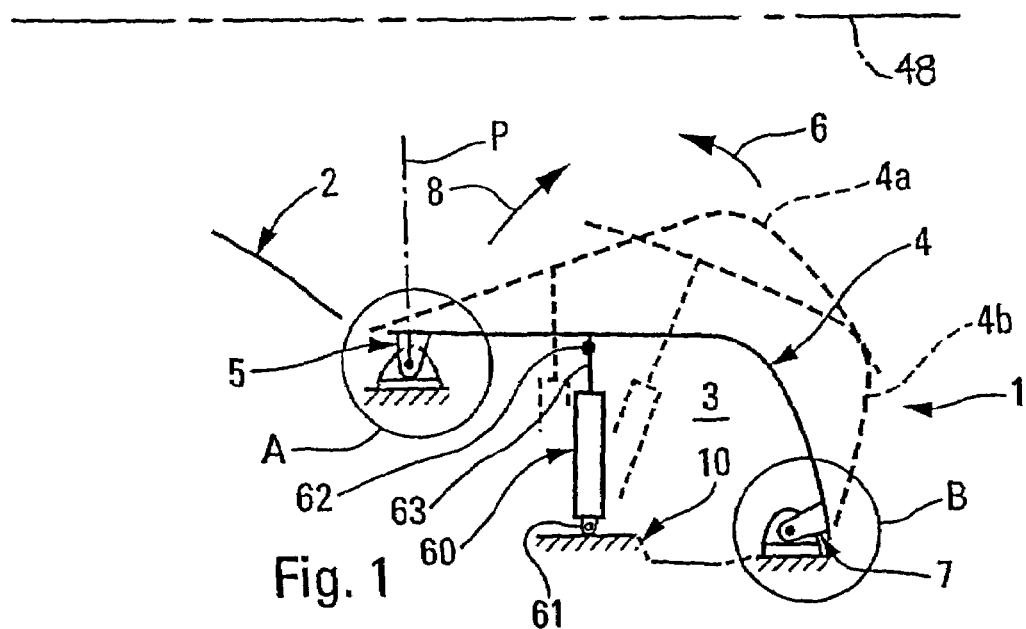
FIG. 1 is a partial diagrammatic view, of longitudinal section, of a vehicle comprising a rear boot hood according to the prior art.
Figure 4:
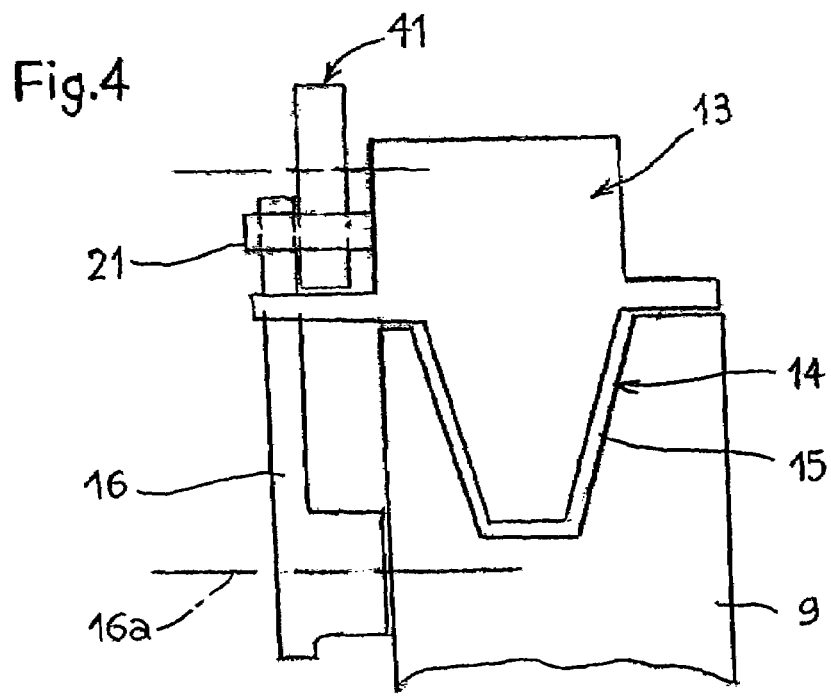
FIG. 4 is a view according to section IV—IV in FIG. 3, the hook being in its locked position.

FIG. 1 diagrammatically represents a convertible vehicle, reference 1, whose roof 2 is collapsible into the inside of the rear boot 3 of the vehicle 1. Such a collapsible roof 2 is known of.

The hood 4 of the rear boot 3 preferably comprises near its front edge (AVT) a front set of pivots 5 including two identical units capable of swivelling this hood from the rear to the front, in the direction of the arrow 6 in FIG. 1, until it reaches the position 4a in the drawing, to provide easy access to the rear boot, for example to place luggage (not represented).

The hood 4 swivels in a standard manner through the operating of at least one actuator 60 (normally two actuators 60 placed on either side of the rear boot 3).

Each actuator is articulated at its base 61 on the bodyshell 10 of the vehicle, and the end 62 of its rod 63 is, directly or indirectly, articulated on the hood 4.

The hood 4, in principle, also comprises, near its rear edge (ARR), a rear set of pivots 7 with two units capable of swivelling the hood 4 from the front to the rear, in the direction of the arrow 8, until it reaches the position 4b, to allow the passage and the storing of the collapsed roof 2 inside the boot 3.

As represented in detail in FIGS. 2a and 2b each set or unit of pivots 5 and 7 comprises a base 9 fixed to the bodyshell 10 of the vehicle and which comprises a first assembly element 13 capable of having fitted to it, in a detachable manner, a second assembly element 14 of complementary shape fixed to a body 11 linked to the hood 4 by a structure creating a hinge 12.

As notably represented in FIGS. 2a to 4, the first assembly element 13 is a substantially wedge-shaped male element capable of being fitted to the second female element 14 which comprises a substantially wedge-shaped cavity 15. The surface 13a of the projecting element 13 guides the end of the swivelling of the hood, by accompanying the element along the walls 15b of the cavity 15.

The wedge shape of the first and second assembly elements ensures accurate guiding of the end of the swivelling movement of the hood 4 to its closed and locked position, these wedge shapes extending along a vertical plane P transversal in relation to the hood.

Each set of pivots 5 and 7 also comprises means for locking/unlocking comprising a first means for engaging 16 linked in a movable manner to the corresponding base 9 and capable of engaging in a free manner a second complementary means for engaging 17 linked to the first assembly element 13 so as to, in a locked position, lock the body 11 in relation to the corresponding base 9.

Preferably, the means for locking each comprise, as the first means for engaging 16, a hook mounted in a swivel manner onto the base 9 (axle 16b) and capable of gripping with the second complementary means for engaging 17, which advantageously defines a backup support in the shape of a stub. The hook leans against this backup and guides the end of the swivelling movement of the hood until it reaches the corresponding locked position.

In this embodiment, the free end 16a of the hook 16 is skewed (16e) and its engaging surface 16c which engages the cylindrical stub 17 advantageously extends according to a circle C whose centre is located on the axle 16b.

The co-operation between the chamfer 16e and the highly rounded surface 17a of the stub 17 allows to progressively initiate tightening and avoid any jamming. Then, once the required pressure has been reached, the hook ensures a substantially constant pressure throughout the rest of its swivel stroke on the complementary means for engaging linked to the body 11.

With the movement of the surface 16c along the circle C, the wear and tear or distortion is notably limited on the hook head 16a1 and/or the elements of the body with which they co-operate, and therefore the risks of play between them, which would affect the locking.

Figure 5:
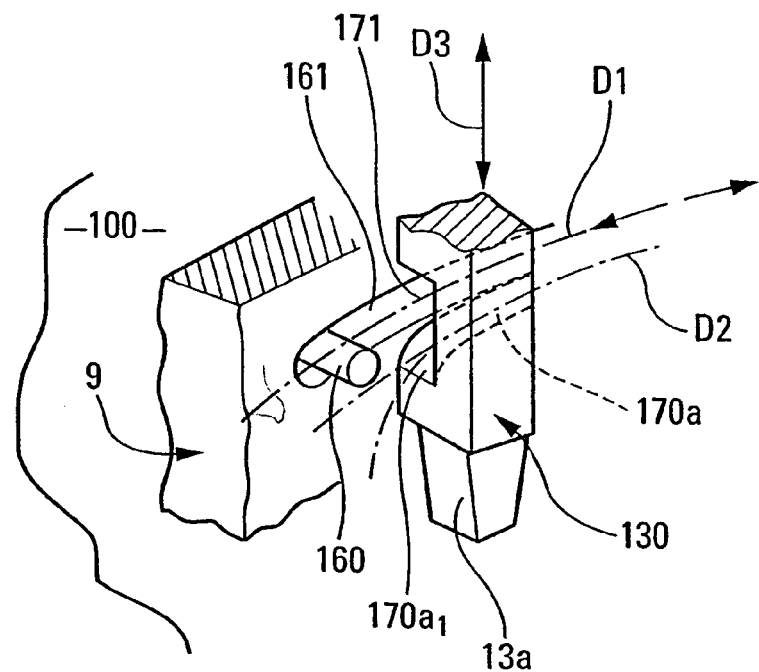
FIGS. 5 and 6 diagrammatically illustrate two alternative embodiments of the locking system.

In FIG. 5, the hook is replaced by a slug 160 with a curved support surface 160c projecting through a slot 161 of a base 9 linked to the structure 100 of the vehicle. The slug slides in the slot in order to co-operate with a curved support surface 170a made in a hole 171 of the first assembly element 130 (which can, in addition, be identical to means 13, notably with the wedge 15a).

The respective directions D1 and D2 of locking and extension of the slug and of the surface 170a are parallel and have the same curve, only the start 170a1 of the surface 170a is steeper so that the slug which firstly meets this start, during the final swivelling of the hood, displaces the element 130 in the engagement direction D3 (substantially perpendicular to D1), before applying the desired constant pressure, the element 130 remaining motionless along D3.

Figure 6:
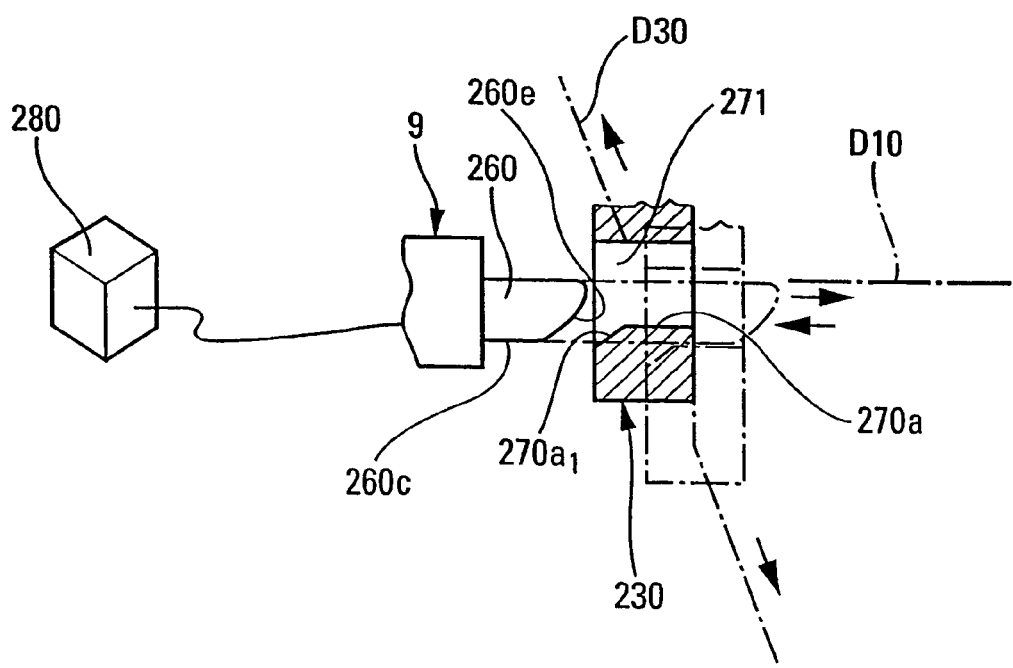

In FIG. 6, the movable element of the lock, linked to the base 9, is a hood locking bolt 260 with an active surface 260c terminated by a chamfer 260e and driven by a straight line movement along D10, transversal to the engagement direction D30 which extends at an angle. During locking, the hood locking bolt, put into motion by the means of drive 280 (electric motor), firstly meets, on the inside of the opening 271 where it can fit into, the bevel 270a1 of the surface 270a of the first assembly element 230 linked to the hood. The hood-locking bolt then pushes the element 230 downwards, along D30 (dot and dash line), until it reaches the straight line surface 270a parallel to the surface 260c.

Both to favour this compensation for play and to obtain the aforementioned double locking effect, the first assembly element 13 of each front and rear set of pivots further comprises, according to another aspect of the object (possibly separable from this constant pressure lock), a third complementary engaging element 21 capable of being engaged in a free manner by the means 16 (even 160 or 260), so that:

for a lock in the closed position of the hood, the first movable engaging elements 16 of the front and rear sets of pivots engage, in a co-ordinated manner, the corresponding second 17 and third 21 complementary engaging elements;

whereas, for an opening swivelled towards the rear of the hood 4, during folding away or unfolding of the roof 2 in the (or out of the) boot, each first engaging element 16 of the rear and front sets of pivots operates so as to respectively and solely engage the corresponding second complementary means for engaging 17 of the rear set of pivots 7 and release, in a co-ordinated manner, the second and third complementary engaging elements of the front set of pivots 5; and inversely for an opening swilled towards the front of the hood.

In the illustrated solution, a full locking of the hood 4 or an authorised opening of the latter, towards the front or the rear, is thus obtained, depending on the engagement (rotation) angle of the hooks 16.

Preferably, each third complementary engaging element 21 consists, just as the element 17, in a backup support. And it is advantageously placed so that the corresponding hook 16 successively meets and leans against the second then the third concerned complementary engaging element, during the locked closing of the hood.

In this regard, we note that, in the illustrated solution, both the backups 17 and 21 each have the form of a stub projecting towards the hook 16, transversal to the engagement direction 18, and the hook 16 is shaped and placed on the base 9 so that its free end 16a leans against the stubs when they meet, for two reasons, on one hand, solicit the first assembly element 13 in the direction of the arrow 18 towards its locked position in the corresponding base 9, and on the other hand, lock it there.

Just as the upper support surface of the stubs 17, that of the stubs 21 is in fact here rounded, for the same reasons.

In addition, the hook 16 is advantageously shaped so as to resist any attempt to open the hood 4, in that a vertically upward effort being applied to the assembly element 13 does not exercise any force on the hook tempting to make it swivel towards its unlocked position (solid line in FIGS. 2a and 2b, the locked position of the end of the hook being represented by a dotted line).

In like manner, the (or each) hook 16 is shaped and arranged on the base 9, in relation to the elements 17 and 21, so that it is capable of gripping with them in a position of the element 13 as far away as possible from its locked position. The first means for engaging 16 is thus a motor element commanding the end of the swivel movement of the hood 4, in co-operation with the actuators 60.

The hood 4 comprises means 64a and 64b (FIGS. 2a and 2b) to make each hook 16 swivel in one or other direction around its swivel axle (here horizontal 16b) to lock or release the assembly element 13. These means for swivelling can be any known means, and can comprise a drive motor, for example, a worm engaging with teeth integral with the hook. An embedded control unit 65 with a microprocessor and/or sensors commands the motor in an appropriate manner, in particular to co-ordinate the movements of the means 16 during the locking or opening of the hood. It is noted that the vehicle preferably further comprises means, such as a lock 67 fixed to the boot and linked to at least the rear set of pivots 7 (means for engaging 16) so as to be able to manually unlock it from the outside of the vehicle.

In the embodiment represented in FIGS. 2a and 2b, the piece creating the hinge 12 of each set of pivots 5 and 7 comprises two substantially parallel arms 40 and 41, articulated (directly or indirectly) at an end on the inner part of the hood 4 and at the opposite end on a foot (or second arm) 43 integral with the corresponding first assembly element 13.

Advantageously, when one such foot and at least one such arm 40 or 41 exist, they respectively bear a second and third means 17 and 21. According to the case, the arm 41 fitted with the stub 21 does or does not lean against, in 44, a part 45 of the foot 43. In particular, malleable seals 50 and 52, preferably respectively fitted on the internal rim of the hood 4 and of the part facing the bodyshell 10 (FIGS. 2a and 2b), can be placed and designed, in connection with the locking/unlocking system 5 and 7 so that once the lock 16 (even 160, 260 etc.) is held by the complementary means 17 (respectively 170a and 270a), the seals are already in their normal compressed state and the play 19 (FIG. 3) has already been taken up. It is then unnecessary for the lock to lean against the third complementary means 21 until it compensates for the play in 44 opposite the rim 45; the arm 41 may not necessarily lean against the rim 45.

The zones 44 and 45 are preferably located passed the stub 17 (in relation to the engagement direction 47 of the means 16 indicated in FIG. 3), in the closed position of the hood, so that the locking of the hood induced by the action of 16 and 17 is efficiently completed via the elastic effect of the seals and/or the pressure in 44 which secures the locking and compensates for the play in 19 (bond line of 13 and 14).

The zone of controlled play 44 is in addition located at an end of an extension 49 of the arm directed towards a shoulder 45 of the foot 43 in the shape of a flat extension. The zones and means 21, 44 and 45 are in the closed position of the hood and along the longitudinal axis 48 of the vehicle, located nearer the axial end nearest to this hood than the piece 21 is and the zone of co-operation between the elements 13 and 14.

In the illustrations, where double arms are envisaged, each foot 43 has, substantially parallel to the axis 48 and in the closed position of the hood, an elongation, the arm 41, fitted with the third means for engaging 21, articulating towards an axial end (4c or 4d) of the hood, the other arm 40 being articulated towards the end 43a of the concerned foot the furthest from the corresponding axial end of the hood, along the axis 48.

Moreover, a retracting spring 51 fitted to each set of pivots 5 and 7 and placed between the hood 4 and the corresponding body 11 (here the foot 43) returns the hood 4 in its closed position in FIGS. 2a and 2b.

We also note that at the front, the hooks are preferably open towards the front and at the rear, open towards the rear.

Of course, the invention is not restricted to the embodiment that has just been disclosed, and modifications can be made to it without diverging from the scope of the invention.

We can thus replace the wedge shapes of the assembly elements 13 and 14 by tapered shapes or pyramid frustum shapes ensuring a guiding both in the longitudinal plane and in the transversal plane.

We can also envisage the base 9, the hook 16 (even 160 or 260) and its motor on the hood 4 and the body 11 on the bodyshell (or structure) 10 and 100 of the vehicle.

Figure 7:
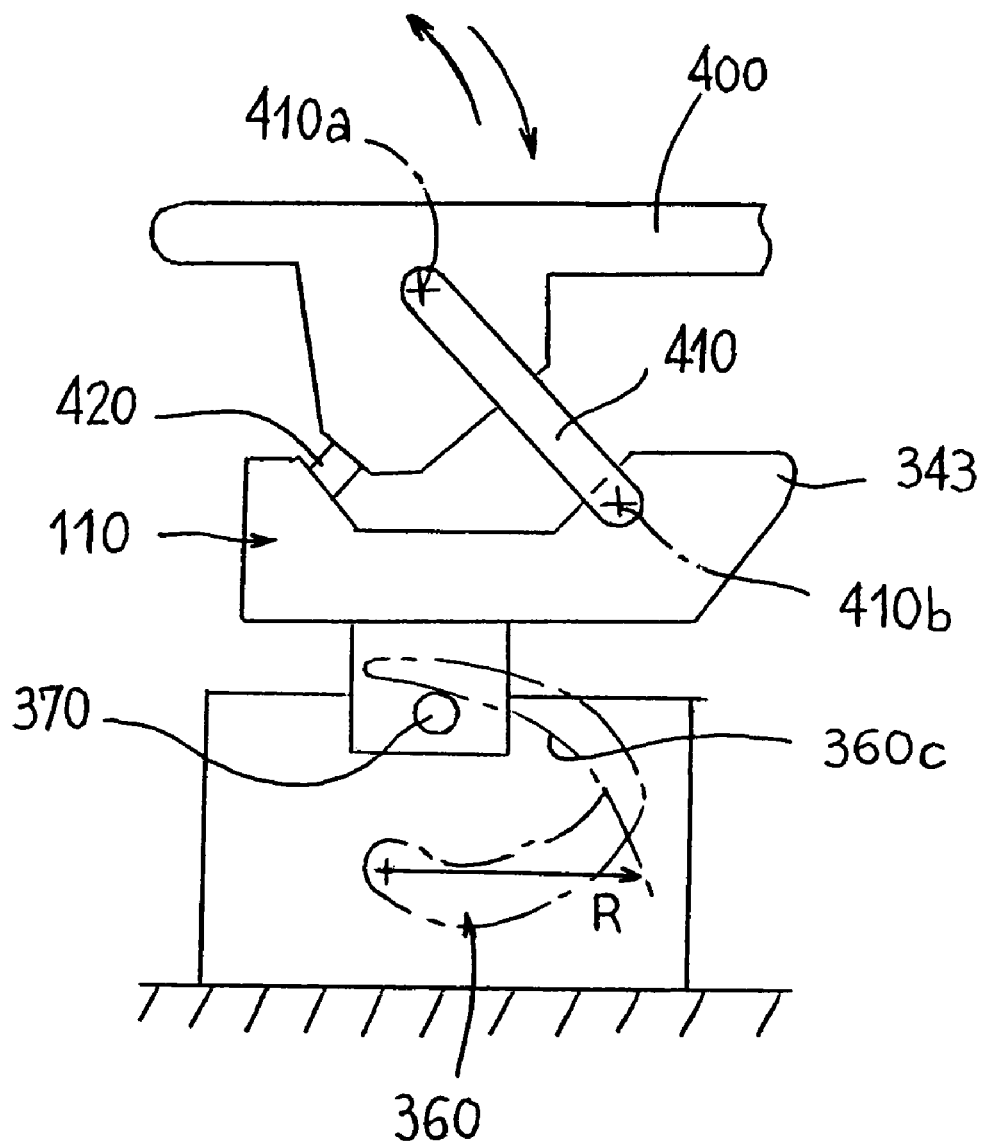
FIG. 7 diagrammatically shows another articulation of the hood.

In FIG. 7, another articulation of the hood is illustrated. The hook 360 is in constant pressure (radius R) with its surface 360c in an arc of circle which engages the slug 370 of the body 110, which is linked to the hood 400. The articulation of the hood is performed through a foot 343 and a connecting rod 410 articulated in 410a and 410b in relation to the hood and the foot 343. A flexible support plate 420 is envisaged.

In connection with the constant locking pressure aspect of the object, other hood articulation solutions can be chosen, such as U.S. Pat. No. 6,092,335 or its equivalent FR-B-2 777 241.

The invention claimed is:

1. A convertible vehicle having a front and a rear, and comprising a bodyshell locally defining a rear boot which is provided with a hood, a roof collapsible into said rear boot, and, first pivot means and second pivot means which are adapted for allowing said hood to swivel with respect to the bodyshell, from said rear towards said front and from said front towards said rear, respectively, each of said first and second pivot means comprising:

a base fixed to said bodyshell of the vehicle,
a body attached to the hood through hinge means, said body comprising a first assembly element adapted for reversibly engaging a second assembly element by means of first and second runner surfaces respectively fitted to the first assembly element and to the second assembly element, said second assembly element being attached to said base and said first and second runner surfaces being engaged together only at a final portion of said swivelling of the hood relative to the bodyshell, for guiding the hood along said final portion, up to a locked position in which said hood is locked on said bodyshell,
reversible locking means comprising a first engaging means movably connected to the base along a displacement track of a reversible locking direction and adapted for reversibly engaging a second complementary engaging means connected to the first assembly element so as to lock the body to said base, in said locked position, the first engaging means and the second complementary engaging means having a first contact surface and a second contact surface, respectively,
control means to bring the second complementary engaging means across the displacement track of the corresponding first engaging means, along an engagement direction transversal to said reversible locking direction,
wherein the respective first and second contact surfaces are so designed that while said first contact surface is engaging said second contact surface, along at least a major portion of the movement of the first engaging means on said displacement track, said first engaging means is applying a essentially constant pressure on the corresponding second complementary engaging means.

2. The vehicle set forth in claim 1, wherein the first engaging means is swivelly mounted relative to the corresponding base, around a swivel axis.

3. The vehicle set forth in claim 1, wherein:
the first engaging means is swivelly mounted relative to the corresponding base, and
at least some of the second and first contact surfaces respectively belong to a backup support of the first assembly element and to the first engaging means, said first engaging means being adapted for gripping with said backup support so as to:
lean against it, during locking, while the first assembly element has not yet reached its locked position, along said engagement direction, and
accompany a final portion of the swivel movement of said first assembly element, and thus that of the hood, down to said locked position.

4. A convertible vehicle having a front and a rear, and comprising a bodyshell locally defining a rear boot which is provided with a hood, a roof collapsible into said rear boot, and, first pivot means and second pivot means which are adapted for allowing said hood to swivel with respect to the bodyshell, from said rear towards said front and from said front towards said rear, respectively, each of said first and second pivot means comprising:
a base fixed to said hood,
a body attached to the bodyshell through hinge means, said body comprising a first assembly element adapted for reversibly engaging a second assembly element by means of first and second runner surfaces respectively fitted to the first assembly element and to the second assembly element, said second assembly element being attached to said base and said first and second runner surfaces being engaged together only at a final portion of said swivelling of the hood relative to the bodyshell, for guiding the hood along said final portion, up to a locked position in which said hood is locked on said bodyshell, reversible locking means comprising a first engaging means movably connected to one of the body and the base along a displacement track of a reversible locking direction and adapted for reversibly engaging a second complementary engaging means connected to the first assembly element so as to lock the base to said body, in said locked position, the first engaging means and the second complementary engaging means having a first contact surface and a second contact surface, respectively, control means to bring the second complementary engaging means across the displacement track of the corresponding first engaging means, along an engagement direction transversal to said reversible locking direction, wherein the respective first and second contact surfaces are so designed that while said first contact surface is engaging said second contact surface, along at least a major portion of the movement of the first engaging means on said displacement track, said first engaging means is applying a essentially constant pressure on the corresponding second complementary engaging means.

5. The vehicle set forth in claim 4, wherein the first engaging means is swivelly mounted relative to the corresponding body, around a swivel axis.

6. The vehicle set forth in claim 4, wherein:
the first engaging means is swivelly mounted relative to the corresponding body, and
at least some of the second and first contact surfaces respectively belong to a backup support of the first assembly element and to the first engaging means, said first engaging means being adapted for gripping with said backup support so as to:
lean against it, during locking, while the first assembly element has not yet reached its locked position, along said engagement direction, and
accompany a final portion of the swivel movement of said first assembly element, and thus that of the hood, down to said locked position.

7. Vehicle set forth in claim 1 or 4, wherein the first and second pivot means comprise respectively a front set of pivots adapted to swivel the hood from the rear to the front and a rear set of pivots, located nearer the rear of the boot and the hood than the front set of pivots and adapted to swivel said hood from the front towards the rear.

8. The vehicle set forth in claim 7, wherein:
the first engaging means comprise hooks,
the front set of pivots is located at the front of the boot and the hood and the rear set of pivots is located at the rear of the boot and the hood;
and, at the front, the hooks are open towards the front and, at the rear, the hooks are open towards the rear.

9. The convertible vehicle of claim 1 or 4, wherein said first contact surface is curved along said reversible locking direction.

10. The convertible vehicle of claim 9, wherein said second contact surface is curved.

11. The Vehicle set forth in claim 1 or 4, wherein at least one of the first and the second contact surfaces has an initial pressure zone where, during locking, the contact is initiated between said first and second contact surfaces, the initial pressure zone being angulated relative to said reversible locking direction of the corresponding first engaging means and being interposed on the displacement track of said first engaging means, so that said first engaging means displaces the corresponding second complementary engaging means along said engagement direction, by applying a pressure that initially increases, as the contact between said first and second contact surfaces develops, before said pressure becomes and remains substantially constant, while said second complementary engaging means substantially stops moving along said engagement direction.

12. The vehicle set forth in claim 1 or 4, wherein said first contact surface of the first engaging means extends at least essentially along a circle having a centre located on said swivel axis.

13. The vehicle set forth in claim 2 or 5, wherein said first contact surface of the first engaging means extends at least essentially along a circle having a centre located on said swivel axis.

14. The vehicle set forth in claim 1 or 4, wherein
each first engaging means comprises a hook,
the first contact surface of said first engaging means is curved along said reversible locking direction, and
the corresponding second contact surface of the second complementary engaging means is also curved.

15. The vehicle set forth in claim 1 or 4, wherein the first runner surface is located on a substantially wedge-shaped male element of the first assembly element adapted to engage a substantially wedge-shaped female cavity element of the second assembly element.

16. The vehicle set forth in claim 1 or 4, wherein the second assembly element of each of said first and second pivot means comprises a third complementary engaging means adapted to be reversibly engaged by the corresponding first engaging means, and wherein, at the location of one of said first and second pivot means, the corresponding first engaging means engages the corresponding second complementary engaging element, whilst releasing the corresponding third complementary engaging element from engagement therewith, thus creating a hinge effect during swivelling of the hood, while at the location of the other of said first and second pivot means, the corresponding first engaging element releases both the corresponding second and third complementary engaging elements from being engaged therewith, so that the hood can be there distanced from the bodyshell, by swivelling around said created hinge.

* * * * *